Aug. 3, 1965 R. B. LARSEN ETAL 3,198,331

SERIAL CARD READER

Filed March 29, 1963 4 Sheets-Sheet 1

INVENTORS
RAYMOND B. LARSEN
CLARENCE W. DeKARSKE
WALLACE B. EDWARDS, JR.
ARCHIE H. HIGGINS
ROBERT W. BONNEMA
BY Philip H. Sheridan
ATTORNEY INVENTORS
RAYMOND B. LARSEN
CLARENCE W. DEKARSKE
WALLACE B. EDWARDS, JR.
ARCHIE H. HIGGINS
ROBERT W. BONNEMA
BY Philip H. Sheridan
ATTORNEY

SERIAL CARD READER

Filed March 29, 1963

4 Sheets-Sheet 3

INVENTORS
RAYMOND B. LARSEN
CLARENCE W. DEKARSKE
WALLACE B. EDWARDS, JR.
ARCHIE H. HIGGINS
ROBERT W. BONNEMA
BY Philip H. Sheridan
ATTORNEY

SERIAL CARD READER

Filed March 29, 1963

INVENTORS
RAYMOND B. LARSEN
CLARENCE W. DeKARSKE
WALLACE B. EDWARDS, JR.
ARCHIE H. HIGGINS
ROBERT W. BONNEMA
BY Philip H. Sheridan
ATTORNEY

United States Patent Office 3,198,331
Patented Aug. 3, 1965

3,198,331
SERIAL CARD READER

Raymond B. Larsen and Clarence W. De Karske, Broomfield, Colo., Wallace B. Edwards, Jr., Minneapolis, Minn., Archie H. Higgins, Broomfield, and Robert W. Bonnema, Denver, Colo., assignors to Uptime Corporation, Golden, Colo., a corporation of Wyoming Filed Mar. 29, 1963, Ser. No. 268,863
6 Claims. (Cl. 209—110)

This invention relates to an information reader, such as a punched card reader and particularly to such a reader adapted to read punched columns on cards on a column-by-column basis at high speeds.

This is an improvement over U.S. patent application Serial No. 768,332, filed October 20, 1958, now patent No. 3,142,749, in the name of Raymond B. Larsen, entitled "Reading Machine" and assigned to the same assignee as the present application.

Stated in general terms, the invention is directed to a system of reading cards containing coded information, including a card load hopper for a deck or stack of cards to be read and at least one card stacking hopper for stacking cards that have been read. A second stacking hopper, or a reject bin, is included for cards that have been read and found to contain information of a different class from those programmed for the first stacking hopper, or found to contain errors, respectively. A continuous, programmed card selecting or picking device is cooperatively associated with the card load hopper to deal or pick a card to be read from the hopper, and started through a card transport channel with the aid of sets of interference rollers. Cooperatively aligned with the card transport channel is a card reader provided with linearly spaced sensory means, preferably photo-diodes, for timing the progress of the transported card through the card reader. The card reader also is provided with a set of transversely spaced sensory means, preferably photo-diodes, synchronized with the linearly spaced sensory means, and adapted to sense coded information on the transported card. A controlled card switching vane or gate is located in the card transport channel, after the card reader, to direct the transported card, after it has been read by the card reader, to one of the two card stacking hoppers (or reject bin), in accordance with programming instructions incorporated in an auxiliary computer, either by wired logic or program.

The auxiliary computer is available on the market and is understood by persons skilled in the computer art. The computer, as such, is not considered as a novel element of the invention and is, therefore, not illustrated.

A description of a preferred embodiment of the invention is given below with reference to the accompanying drawings, wherein:

FIG. 1 is a partial front elevational view showing the serial card reader without its usual housing or cover;

FIG. 2 is a partial front elevational view drawn to an enlarged scale showing details of the portion of FIG. 1 including a driven roller 19, knife throat 16 and read head 18;

FIG. 3 is a similar partial front elevational view showing details of the portion of FIG. 1 including the selection vane 25, vane seat 35 and transport jam photo-diode 44;

Figure 1:
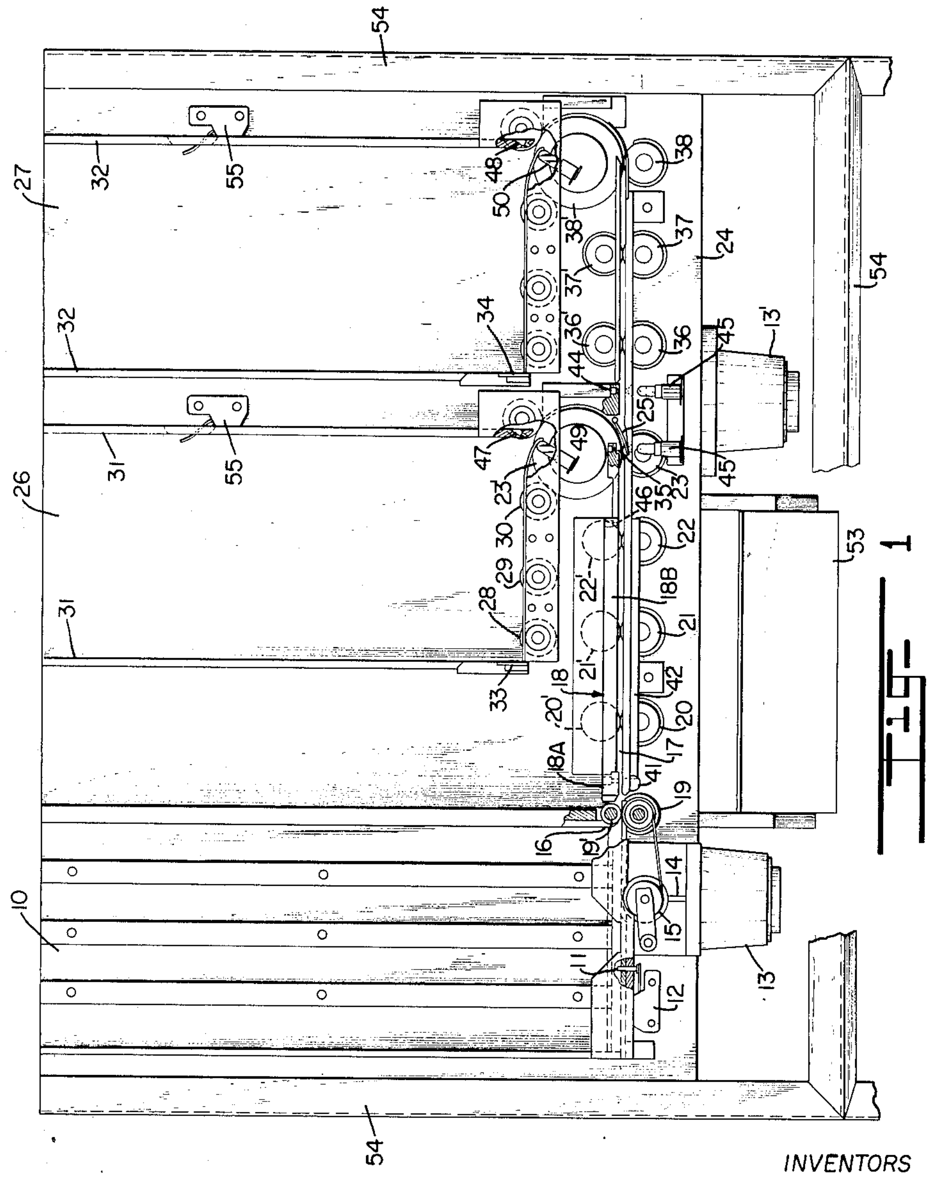
Figure 5:
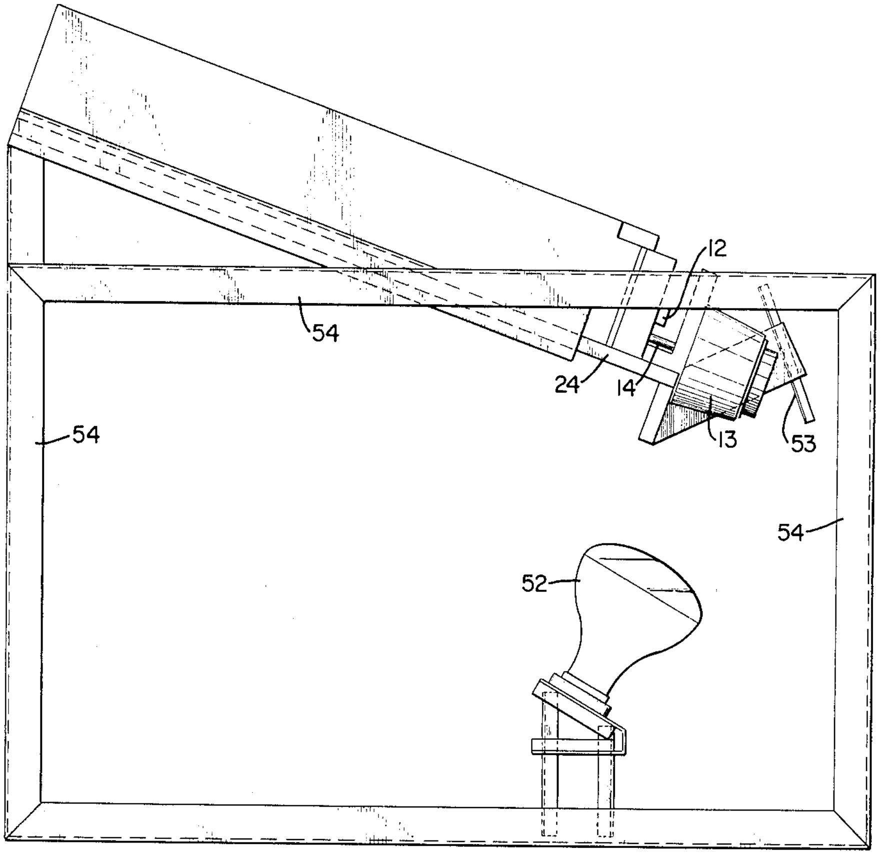
FIG. 5 is a partial side elevational view of the serial card reader shown in FIG. 1.

The preferred embodiment of the invention shown in the drawings is capable of reading 80-column punched cards on a column-by-column basis at rates up to 1500 cards per minute.

The punched cards, containing coded information, are placed in a load hopper 10, generally with printed side and lead edge down. This hopper has a capacity of 3000 cards. A nylon plunger 11, moving through a hole in the bottom of the load hopper 10 is depressed when there are cards in the hopper. When plunger 11 is depressed, it makes contact with a microswitch 12, which in turn maintains a picking circuit closed. In this situation, cards are picked, or dealt, from the bottom of load hopper 10 in accordance with a pick signal from a computer, as long as any cards remain in the load hopper.

Upon a signal from an auxiliary computer (not shown) to pick, a suitable electro-magnetic device or voice coil 13 is energized, and via a connecting shaft 14, forces a rotating polyurethane picker wheel 15 into the card at the bottom of the deck in load hopper 10. Wheel 15 is rotating in a clockwise manner and moves the card from left to right as shown in FIG. 1. The picker wheel 15 drives the card into a knife throat 16. This knife throat is adjustable, and insures that only one card at a time is picked from the deck in the load hopper 10. As the card passes through the knife throat 16 it enters the transport channel 17, where the reading of the punched information takes places. The card is moved across the read head 18 by a series of interference rollers. This series consists of five sets; the drive rollers 19, 20, 21, 22 and 23, are of stainless steel, and are coupled through timing belts and pulleys to an electric motor mounted on the rear of base plate 24. Roller 19' which, as is shown in FIG. 1, has a smaller diameter than roller 19, is also a drive roller, is of stainless steel and has the surface thereof spaced apart from the surface of roller 19. The idlers 20', 21', 22', and 23' are of an elastic compound.

Figure 3:
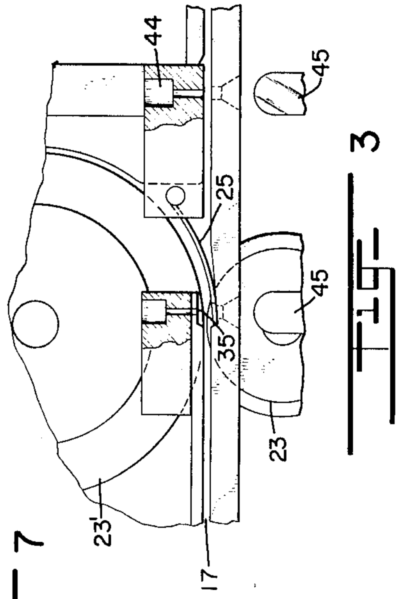
Figure 6:
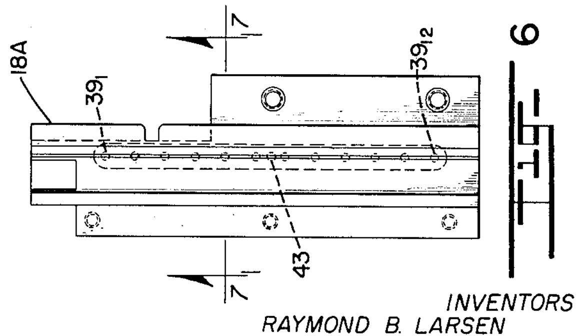
FIG. 6 is a plan view showing the data read head portion *18a* of the read head 18.

The metal selection vane or gate 25 determines, by its position, into which stacker hopper, 26 or 27, the card is directed. In the position of the vane 25 as shown in FIGS. 1 and 3, the card is transported by idler 23', into stacker hopper 26, reversing its direction 180°. As the card enters the hopper 26, three drive rolls, 28, 29 and 30, of stainless steel, transport the card all the way into the stacker hopper 26. The side walls 31 and 32 of the stacker hoppers 26 and 27 are of aluminum. If the card is driven against this hard material, the lead edge of the card becomes damaged. To avoid this, pillows 33 and 34 of elastic compound are placed near the bottoms of the stacker hoppers where the cards strike the side walls 31 and 32.

When the vane 25 is pulled up into the seat 35, the card is directed straight through where a second series of three sets of interference rollers, 36, 36′, 37, 37′ and 38, 38′ transport the card into stacker hopper 27 in the identical manner as described hereinabove with reference to hopper 26.

The actuation of the selection vane 25, to pull it into seat 35, is caused by energizing a voice coil 13′. The auxiliary computer, either by wired logic or program, decides, after reading the card through read head 18, into which hopper, 26 or 27, the card should go, and sends a signal to the voice coil 13′, which in turn sets the selection vane 25 position, as shown, or pulled into seat 35.

Figure 2:
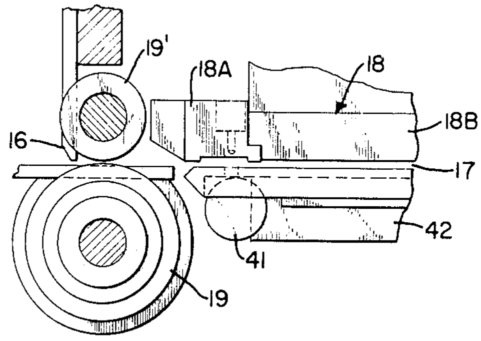
Figure 9:
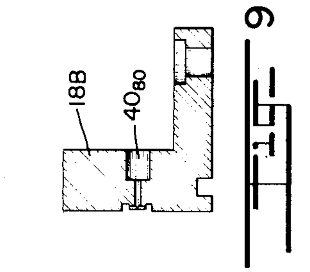
FIG. 9 is a cross-sectional view taken along the line 9—9 of FIG. 8.
Figure 4:
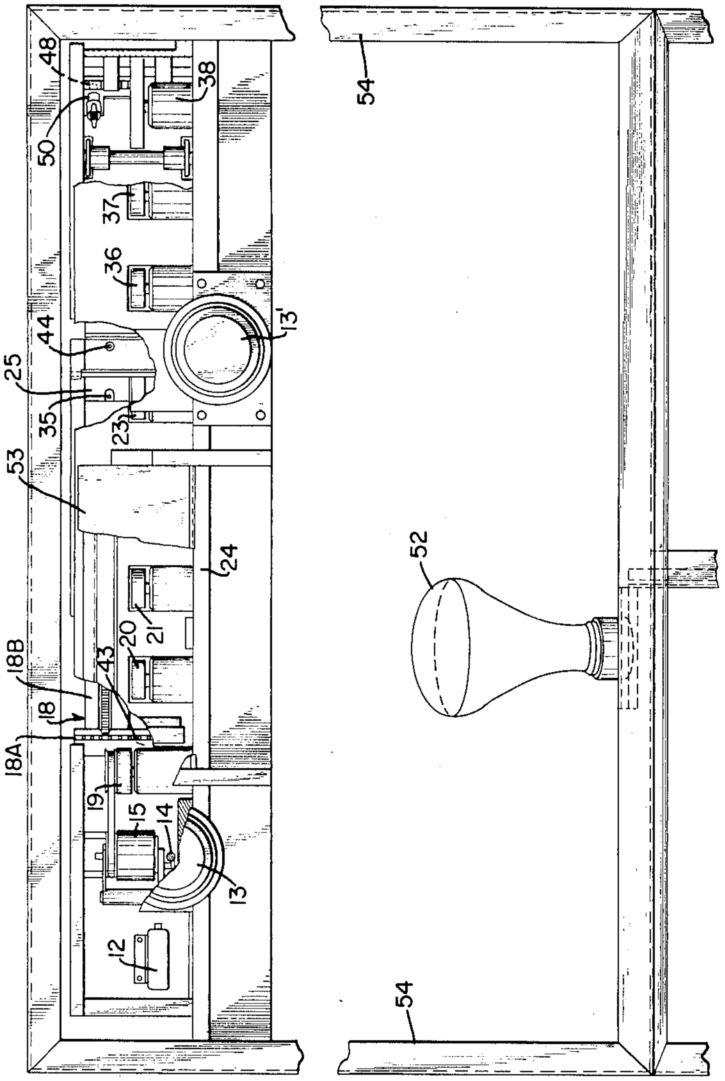
FIG. 4 is a partial bottom plan view of the serial card reader shown in FIG. 1.

Reading of the punched card is accomplished as the five sets of rollers, 19, 19′, 20, 20′, 21, 21′, 22, 22′ and 23, 23′, transport the card across the read head 18. Read head 18 is made up of two parts, data read head 18*a* and timing read head 18*b*, shown in detail in FIGS. 6 to 9, and mounted together in the serial card reader apparatus, as best shown in FIGS. 2 and 4. Referring to FIGS. 2, 4 and 6 to 9, the card crosses the head 18 in a column-by-column fashion. Transversely mounted in the data read head 18*a* portion of read head 18 are twelve information photo-diodes $39_1$ to $39_{12}$ and linearly mounted in timing read head 18*b* portion of read head 18 are eighty timing photodiodes $40_1$ to $40_{80}$. The twelve information photo-diodes $39_1$ to $39_{12}$ are incorporated in an auxiliary circuit (not shown) to supply an electrical output whenever a change from dark to light is detected in the punched card. The eighty timing photo-diodes $40_1$ to $40_{80}$ are incorporated in an auxiliary circuit (not shown) to supply an output only when light to dark is detected in the punched card.

Figure 8:
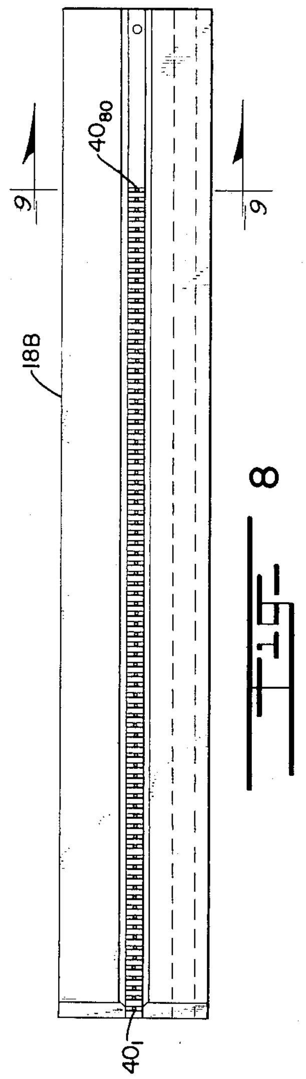
FIG. 8 is a plan view showing the timing read head portion *18b* of the read head 18.
Figure 7:
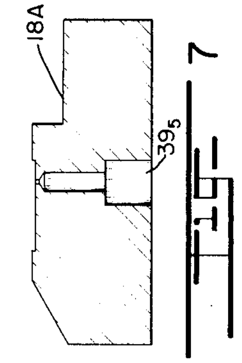
FIG. 7 is a cross-sectional view taken along the line 7—7 of FIG. 6.

The photo-diodes employed in the serial card reader of this invention are similar in construction and operate in a manner similar to the construction and operation of the photo-diodes shown and described in connection with FIGS. 5 to 8 of application Serial No. 768,332, now Patent No. 3,142,749, to which reference was made hereinabove. The operation of the photo-diodes described in said copending application, in connection with the control circuit shown in FIG. 8 of said copending application, together with said FIG. 8, is hereby incorporated by reference in the present specification, as an illustration of the construction and operation of the photo-diodes of the serial card reader of the present invention, to avoid repetition.

At the same instant at which the leading edge of the card passes over the first timing diode $40_1$, the corresponding column of punched holes in the card, that is, column 1 thereof, will in synchronism, be over the column of twelve information diodes, $39_1$ to $39_{12}$. The leading edge cutting light off from the timing diode $40_1$ causes a timing pulse to be emitted, and if a punched hole appears over any of the information diodes, $39_1$ to $39_{12}$ a corresponding information pulse is emitted. The combination of the two pulses tells the auxiliary electrical system, into which the serial card reader is inputting, that that particular bit of information is on the card. As the leading edge of the card shuts off the light to the next timing diode $40_2$, the information in the card is released, and another cycle begins. This is serially repeated in synchronism until all eighty columns of holes punched in the card are read.

Mounted to the face plate for the read head 18, between the light source and the timing diodes $40_1$ to $40_{80}$ and under the information diodes, $39_1$ to $39_{12}$ are lucite rods 41 and 42 (FIG. 2) arranged to insure that the light source 52 employed is focused properly on the photo-diodes. One of two light sources can be used to energize the photo-diodes, a direct, and a reflected source. The direct light source (not shown) employs two incandescent lamps (not shown) pointed directly at the read head 18. The other source employs a single lamp 52 located in the back of the apparatus, aimed at a mirror finish plate 53 (FIG. 5) mounted below the read head. This plate 53 reflects the light through the lucite rods 41 and 42 onto the read head 18.

Structurally, the preferred embodiment of the serial card reader shown in the drawings consists basically of the card transport base plate 24 mounted on a suitable structural frame 54. Attached to the base plate 24 is the entire card transport mechanism, including the load and stacker hoppers 10, 26 and 27, picker mechanism 11, 12, 13, 14, 15, transport channel 17 and selection gate mechanism 25, 35. On the back side of the base plate 24 the drive motors, pulleys and timing belts (not shown) are mounted.

Adjacent space such as that located within a frame and below the serial card reader mechanism, can be used to house all necessary electronics used to integrate the card reader mechanism with a suitable computing system.

A throat jam check photo-diode connected to necessary circuitry is located in the reading head at location 43. If the card is picked properly and it goes through the knife throat 16, this diode goes from light to dark in a predetermined amount of time, emitting a pulse. If the card should jam in the throat 16, the failure of the diode to emit its pulse within the proper time limit, shuts off the serial reader reader mechanism. The timing read head 18*b*, which of course could be arranged to be adjustably mounted, may include a control diode for establishing latest point in time from which decision from a computer may be given to reject and various checking diodes.

On one side plate of each of the stacker hoppers 26 and 27 are cut-off switches 55. When these switches are depressed by the card stack, they close contact with a micro-switch, stopping the operation of the reader because the stacker card capacity has been reached. However, the machine can double its stacking capacity while deleting the reject feature by coupling switch 55, associated with hopper 26, in the selection vane causing the latter to switch position when the cards reach a certain height in hopper 26 and thus cause the cards to stack in hopper 27.

Located at 35 and 44 are photo-diodes, connected into the serial card reader auxiliary circuitry. The light source for these photo-diodes is at location 45. At location 46 in the read head 18 is a photo-diode, receiving its light from the read head source. These photo-diodes perform the following functions. If the photo-diode at 46 is dark, the photo-diodes at 35 and 44 are light. This shows that the card has been read and vane 25 is ready for selection. If the photo-diode at 35 is ever dark, it shows that there is a card in that area and the selection vane 25 cannot be actuated again until that card passes, allowing the photo-diode at 35 to again receive light. Generally, when the card cuts light off from the photo-diode at 46, this initiates stacker selection, as long as the photo-diode at 35 is light. At no time can the vane 25 be actuated if the photo-diode at 35 is not light.

At locations 47 and 48 in stack hoppers 26 and 27, respectively, are stacker jam check photo-diodes, receiving light from sources at 49 and 50, respectively. These diodes must receive light for a predetermined period of time, between cards, if they are entering properly. If this period of time starts to be reduced, meaning the distance between cards entering the hoppers is reducing, the photo-diode circuits will stop the serial card reader mechanism, thus averting possible card jams in the stacker hoppers 26 and 27.

Punched cards can be placed into the card load hopper 10 or removed from the card stacking hoppers 26 and 27 concurrent with the serial card reader operation. Operation of the mechanisms 25, 35 which select the stacking hopper 26 or 27 into which each card from load hopper 10 is directed, is determined by auxiliary program control, or by auxiliary internal logic. An example of the latter is to use stacking hopper 27 as a reject bin. In this case, a given card is sorted out by the mechanism and placed in the reject bin 27 upon detection of a certain class of errors in the punching of the card.

As should be apparent, the essence of this invention may be applied to dual reading, that is where it is desired to read a card twice. For example, a second read head including data and timing diodes and associated auxiliary circuits may be installed at the proper location in the apparatus. Also, throughout the apparatus, where necessary, plates of glass or other transparent material may be included to prevent elements, such as dust, from causing interference.

Obviously many other modifications and variations of the present invention are possible in the light of the above teachings. It is, therefore, to be understood that within the scope of the appended claims, the invention can be practiced otherwise than as specifically described hereinabove.

What is claimed is:

1. A serial card reader comprising a card load means, card activating means for continuously picking a card from the card load means, card transport means for continuously feeding a picked card past a card reader means, said card transport means including a pair of rollers mounted, with respect to the direction of card travel, immediately ahead of the card reader means, one of said rollers having a substantially smaller diameter than the other roller and being mounted with a portion of the surface thereof to lie immediately adjacent to a plane in which is to be positioned one end of the cards which are to be disposed within said card load means, card reader means provided with a first set of sensory means for sensing the relative position of the transported card as it is moved continuously past the card reader means and a second set of sensory means for sensing coded information on the card in synchronism with the first set of sensory means, and switching means controlled by the information sensed by the second set of sensory means for continuously directing the transported card to either a first card receiving means or to a second card receiving means, said first card receiving means being cooperatively associated with the switching means for receiving cards continuously directed thereto, and said second card receiving means being cooperatively associated with said switching means for receiving cards directed thereto.

2. A serial card reader according to claim 1, wherein the first and second sets of sensory means are photosensitive means and said card transport means also includes pairs of interference rollers, the surface of one roller of each pair of interference rollers being formed from a resilient material and the surface of the other roller of each pair of interference rollers being formed from a relatively hard, non-resilient material.

3. A serial card reader comprising a card load means, card activating means for continuously picking a card from the card load means, card transport means for continuously feeding a picked card past a card reader means, said card transport means including a pair of rollers mounted, with respect to the direction of card travel, immediately ahead of the card reader means, one of said rollers having a substantially smaller diameter than the other roller and being mounted with a portion of the surface thereof disposed immediately adjacent to a plane in which is to be positioned one end of the cards which are to be disposed within said card load means, the surfaces of said rollers being spaced apart from each other, punched card reader means cooperatively associated with the card transport means provided with a first set of photosensitive means for sensing the relative position of the transported card as it is moved continuously past the card reader means and a second set of photosensitive means for sensing coded punched information on the card in synchronism with the first set of photosensitive means, and switching means controlled by the information sensed by the second set of photosensitive means for continuously directing the transported card to either a first hopper means or to a second hopper means, first hopper means cooperatively associated with the switching means for receiving cards continuously directed thereto, and second hopper means for receiving cards directed thereto.

4. A serial card reader according to claim 3, wherein the first and second sets of photosensitive means are photo-diode means said card transport means also includes pairs of interference rollers, the surface of one roller of each interference pair being formed from a resilient material and the surface of the other roller of each interference pair being formed from a relatively hard, non-resilient material, the rollers of each interference pair of rollers being mounted with the surfaces thereof in contacting engagement with each other when a card is not disposed therebetween.

5. A serial card reader comprising a card load means, card activating means for continuously picking a card from the card load means, card transport means for continuously feeding a picked card past a card reader means, said card transport means including a pair of rollers mounted, with respect to the direction of card travel, immediately ahead of the card reader means, one of said rollers having a substantially smaller diameter than the other roller and being mounted with a portion of the surface thereof disposed immediately adjacent to a plane in which is to be positioned one end of the cards which are to be disposed within said card load means, punched card reader means cooperatively associated with the card transport means provided with a first set of linearly spaced photo-diodes for sensing the relative position of the leading edge of the transported card as it is moved continuously past the card reader means and a second set of linearly spaced photo-diodes positioned transversely with respect to the first set for sensing coded punched information at a punched column-by-column basis on the card in synchronism with the first set of photo-diodes, switching means controlled by the information sensed by the second set of photo-diodes for continuously directing the transported card to either a first hopper means or to a second hopper means, first hopper means cooperatively associated with the switching means for receiving cards continuously directed thereto, and second hopper means for receiving cards directed thereto, and resilient means mounted along a portion of one wall of each hopper means to intercept the leading edge of each card to be received into each hopper.

6. A serial card reader comprising a card load means, card activating means for continuously picking a card from the card load means, card transport means including aligned sets of interference rollers and a card transport channel for continuously feeding a picked card past a card reader means, said card transport means including a pair of rollers and pairs of interference rollers, said pair of rollers being mounted, with respect to the direction of card travel, immediately ahead of the card reader means, one of said rollers for said pair of rollers having a substantially smaller diameter than the other said roller and being mounted with a portion of the surface thereof disposed immediately adjacent to a plane in which is to be positioned one end of the cards which are to be disposed within said card load means, said pair of rollers being mounted with the surfaces thereof in spaced apart relation, one roller of each pair of interference rollers having a surface formed from a resilient material and the other roller of each pair of interference rollers having the surface formed from a relatively hard, non-resilient material, one of the rollers of each pair of interference rollers being mounted with the surface thereof in contacting engagement with the surface of the other roller of said pair of interference rollers, punched card reader means cooperatively associated and aligned with the card transport means provided with a first set of linearly spaced photo-diodes for sensing the relative position of the leading edge of the transported card as it is moved continuously past the card reader means and a second set of linearly spaced photo-diodes positioned transversely with respect to the first set for sensing coded punched information on a punched column-by-column basis on the card in synchronism with the first set of photo-diodes, vane switching means cooperatively associated with the card transport channel and interference rollers and controlled by the information sensed by the second set of photo-diodes for continuously directing the transported card to either a first hopper means or to a second hopper means, first hopper means cooperatively associated with the switching means and interference rollers for receiving cards continuously directed thereto, and second hopper means cooperatively associated with the interference rollers for receiving cards directed thereto, and resilient stop means mounted along a portion of one wall of each hopper means to intercept the leading edge of each card to be received into each hopper.

References Cited by the Examiner

UNITED STATES PATENTS

| | | | |
|---|---|---|---|
| 2,921,736 | 1/60 | Hatherell. | |
| 2,936,886 | 5/60 | Harmon | 209—111.5 |
| 2,985,298 | 5/61 | Schreiner | 209—110 |
| 3,022,891 | 2/62 | Efram | 209—111.5 |

ROBERT B. REEVES, *Acting Primary Examiner.*